United States Patent
Krull et al.

(10) Patent No.: US 6,611,895 B1
(45) Date of Patent: Aug. 26, 2003

(54) HIGH BANDWIDTH CACHE SYSTEM

(76) Inventors: Nicholas J. Krull, 1103 Enclave Cr., Louisville, CO (US) 80027; William A. Burns, 805 Meadow Glen Dr., Boulder, CO (US) 80303; Stephen S. Selkirk, 5435 W. 112th Pl., Broomfield, CO (US) 80020

( * ) Notice: Subject to any disclaimer, the term of this patent is extended or adjusted under 35 U.S.C. 154(b) by 0 days.

(21) Appl. No.: 09/093,141

(22) Filed: Jun. 8, 1998

(51) Int. Cl.[7] ................ G06F 12/00; G06F 15/167
(52) U.S. Cl. ................ 711/113; 709/214; 709/213
(58) Field of Search ................ 711/111, 112, 113, 711/114, 214; 710/100, 131, 106; 370/58.2, 538, 366, 360, 214, 462; 709/225, 213, 229

(56) References Cited

U.S. PATENT DOCUMENTS

| | | | | |
|---|---|---|---|---|
| 4,630,258 A | * | 12/1986 | McMillen et al. | 370/60 |
| 4,918,688 A | * | 4/1990 | Krause et al. | 370/76 |
| 4,972,161 A | * | 11/1990 | Davies et al. | 331/1 |
| 5,041,963 A | * | 8/1991 | Ebersole et al. | 364/200 |
| 5,193,149 A | * | 3/1993 | Awiszio | 395/200 |
| 5,517,662 A | * | 5/1996 | Coleman et al. | 395/800 |
| 5,546,385 A | * | 8/1996 | Caspi et al. | 370/58.2 |
| 5,604,735 A | * | 2/1997 | Levinson et al. | 370/360 |
| 5,905,877 A | * | 5/1999 | Guthrie et al. | 395/292 |
| 5,953,508 A | * | 9/1999 | Iwatsuki et al. | 395/224 |
| 5,974,058 A | * | 10/1999 | Burns et al. | 370/538 |
| 6,021,495 A | * | 2/2000 | Jain et al. | 709/225 |
| 6,073,186 A | * | 6/2000 | Murray et al. | 710/11 |

OTHER PUBLICATIONS

Webopedia (http://www.webopedia.internet.com/TERM/s/switching_hub.html), Mar. 1998.*
Webopedia (http://www.webopedia.internet.com/TERM/h/hub.html), Mar. 1998.*
"SiI140/SiI141 Datasheet", Silicon Image, Inc. Version 1.0 Dec. 1997, Pub. # DS140/141/001–127–100.

* cited by examiner

Primary Examiner—Kevin Verbrugge
Assistant Examiner—Kimberly McLean

(57) ABSTRACT

A high-bandwidth cache system serves computer elements such as processors and disk arrays through a serial interconnection architecture. The system includes a set of adapters, each adapter connected to at least one computer element, and a cache memory. The system also includes a set of bidirectional multichannel serial data links, each link connecting one of the adapters to the cache.

19 Claims, 11 Drawing Sheets

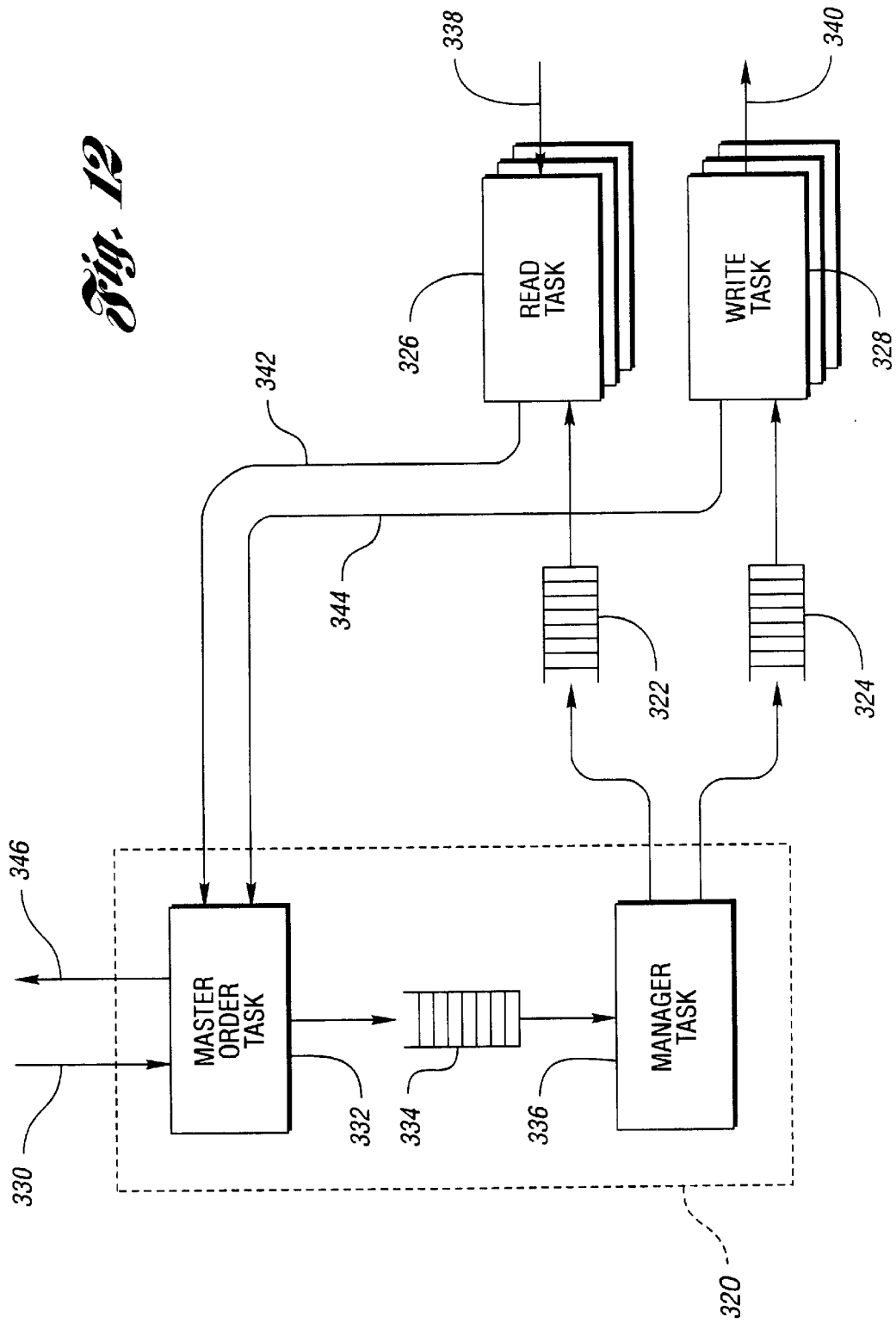

HIGH BANDWIDTH CACHE SYSTEM

TECHNICAL FIELD

The present invention relates to protocols and architectures in cache systems.

BACKGROUND ART

Cache systems provide access to high-speed memory from computer elements such as processors and disk arrays. One use for a cache system is in a DASD controller. A direct access storage device (DASD) is an on-line digital storage device, such as a magnetic disk drive, that allows rapid read and write operations. Often, DASD systems include more than one disk for increased reliability and crash recovery. Such a system can be a redundant array of inexpensive disks (RAID) unit.

In order to meet greater performance demands, cache systems must be capable of handling data at increasing rates. Designing multiple very high data rate channels within a cache system is limited with current parallel bus structures. Such a parallel bus system in shown in FIG. 1.

One possible solution for increasing the data rate is to make the parallel bus wider by increasing the number of data wires. This results in several difficulties such as a greater number of traces on a printed circuit board (PCB) requiring valuable board real state, additional driver/receiver pairs, additional connector pins to provide circuit card-to-circuit card interconnection, and increased associated electrical power.

Another possible solution for increasing the data rate is to send parallel bus control signals on dedicated wires. These separate signals, called sideband signals, may signal the start of transmission, provide timing, specify intended receivers, request attention, or indicate success or failure. Using sideband signals increases the number of connecting wires and, hence, suffers from the same drawbacks as increasing the number of data wires.

Still another possible solution for increasing the data rate is to increase the clock rate used on an existing parallel bus. However, decreasing the time between clock edges is limited by the physics of parallel connecting devices. In particular, each device has an associated capacitance. The total capacitance is the sum of the individual capacitances and the distributed capacitance of the interconnecting trace. The velocity of propagation of a signal down the bus is inversely proportional to this total capacitance and, therefore, the clock switching speed is directly limited by the total capacitance.

A further possible solution for increasing the data rate is to use a currently available serial protocol for bussing data within the cache system. Such protocols include SONET (Synchronous Optical NETwork), Fiber Channel, and USB (Universal Serial Bus). However, these protocols were designed primarily for connection between devices and not as intradevice busses; and primarily for use with particular interconnection media such as fiber optic cable, coaxial cable, or twisted pairs. Therefore, use in PCB busses results in data transfer rates no greater than 200 megabytes per second, below the capabilities achievable using interconnection media for which the existing protocols were designed.

In addition to simply increasing the data rate in a cache system, data must be written to two different disks in a RAID system. One solution with current parallel buses is to send the data twice, effectively halving the data transfer rate. Another solution is to provide multiple parallel paths, requiring twice the hardware. Still another solution is to construct a special protocol enabling two recipients to receive the same data, requiring more complex logic in the protocol engine and potential performance degradation.

What is needed is a cache system that can achieve increased data rates without incurring the problems associated with increasing the number of parallel connections, using sideband signals, increasing the clock rate, or using current serial bus protocols. The ability to support RAID should also be provided.

SUMMARY OF THE INVENTION

It is a primary object of the present invention to increase the data transfer rate over existing parallel bus systems.

Another object of the present invention is to require less PCB real estate, fewer driver/receiver airs, and less interconnections than existing parallel bus systems.

Still another object of the present invention is to develop a cache system with lower cost than existing parallel bus systems.

A further object of the present invention is to support RAID in a DASD control system.

A still further object is to reduce the complexity of arbiters required to implement a serial cache system.

In carrying out the above objects and other objects and features of the present invention, a cache system is provided. The system includes a plurality of adapters, each adapter connected to at least one of the computer elements, a cache, and a set of bidirectional multichannel serial links, each link connecting one of the plurality of adapters with the cache.

In one embodiment, the cache includes a plurality of memory cards, each memory card connected to each adapter through at least one of the plurality of bidirectional multichannel serial links. In a refinement, each memory card includes at least one memory bank and at least one hub in communication with each memory bank, each hub operable to transmit and receive data over at least one of the plurality of bidirectional multichannel serial links. Each hub may be a simplex hub, permitting either memory read or memory write during a memory access period, or may be a duplex hub, permitting simultaneous memory read and memory write during a memory access period.

In another embodiment, each direction of the bidirectional multichannel serial link includes a plurality of serial data drivers, a serial data receiver corresponding to each of the plurality of serial data drivers, the serial data receiver in communication with the corresponding serial data driver, a serial clock driver, and a serial clock receiver in communication with the serial clock driver. In a refinement, serial data drivers and the serial clock driver can be implemented using a flat panel display driver, and serial data receivers and the serial clock receiver may be implemented using a flat panel display receiver.

In still another embodiment, each adapter has a control logic including a control task operative to receive a master order, to decompose the master order into read orders and write orders, and to receive status information; a read queue for holding read orders; at least one read task operative to input at least one cache read order, decompose the read order into a sequence of cache reads, control the sequence of cache reads, and transmit status information to the control task; a write queue for holding write orders; and at least one write task operative to input at least one cache write order, decompose the write order into a sequence of cache writes, control the sequence of cache writes, and transmit status information to the control task. In a refinement, the write task is further operative to send the same sequence of cache writes to a plurality of memory banks thereby implementing data mirroring.

A cache system is also described in which each memory card includes at least one addressable memory bank and at least one hub, each hub having an arbiter. Each hub is in communication with each memory bank. The arbiter is in communication with each adapter and can select at least one adapter for accessing a memory bank. Each adapter is connected to each hub in each memory cards by one of the bidirectional multichannel serial data links.

In one embodiment, particularly suited for use with a single simplex hub in each memory card, the cache system further comprising a request line from each adapter to each arbiter and a grant line from each arbiter to each adapter. Each adapter can assert the request line when access to the memory card containing the corresponding arbiter is requested. Each arbiter can then determine a selected adapter to which access will be granted and assert the grant line to the selected adapter.

In another embodiment, particularly suited for use with multiple duplex hubs in each memory card, the cache system further includes at least one bank bus, each bank bus connecting the arbiter in one of the plurality of memory cards to at least one adapter. In a refinement, each selected adapter places the address of a memory bank to which access is desired on the bank bus connected to the memory card containing the memory bank to which access is desired. Each arbiter receives at least one bank address from each selected adapter and grants access to memory banks based on the received bank addresses.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 12 is a block diagram of tasks in adapter control logic according to the present invention.

BEST MODES FOR CARRYING OUT THE INVENTION

Figure 1:
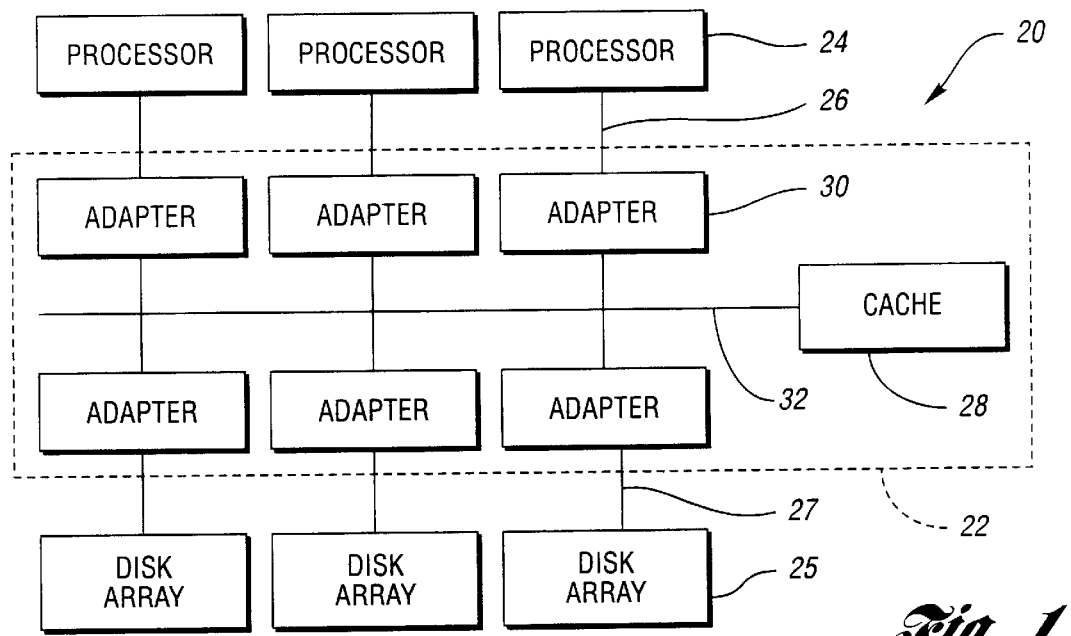
FIG. 1 is a block diagram of a computer system having a DASD controller with a traditional parallel bus architecture.

Referring now to FIG. 1, a block diagram of a computer system having a DASD controller cache system with a traditional parallel bus architecture is shown. Parallel bus computer system 20 includes parallel bus DASD controller 22 and computer elements such as processors 24 and disk arrays 25. Processor 24 may be connected to parallel bus DASD controller 22 through processor bus 26 such as SCSI (Small Computer System Interface), ESCON (Enterprise System Connection), HIPPI (High Performance Parallel Interface), Fiber Channel, or FIPS (Federal Information Processing Standard). Disk array 25 may be connected to parallel bus DASD controller 22 through disk array bus 27 such as SCSI or Fiber Channel. Although three processors, three disk arrays, and six adapters are shown, any number of processors and disk arrays together with their associated adapters are possible in computer system 20.

Parallel bus DASD controller 22 contains parallel cache 28. A cache is a large memory system accessible by processor 24 or disk array 25. Parallel adapter 30 is operative to interface with processor 24 or disk array 25 through processor bus 26 or disk array bus 27 respectively and thereby access cache 28 using parallel bus 32.

Figure 2:
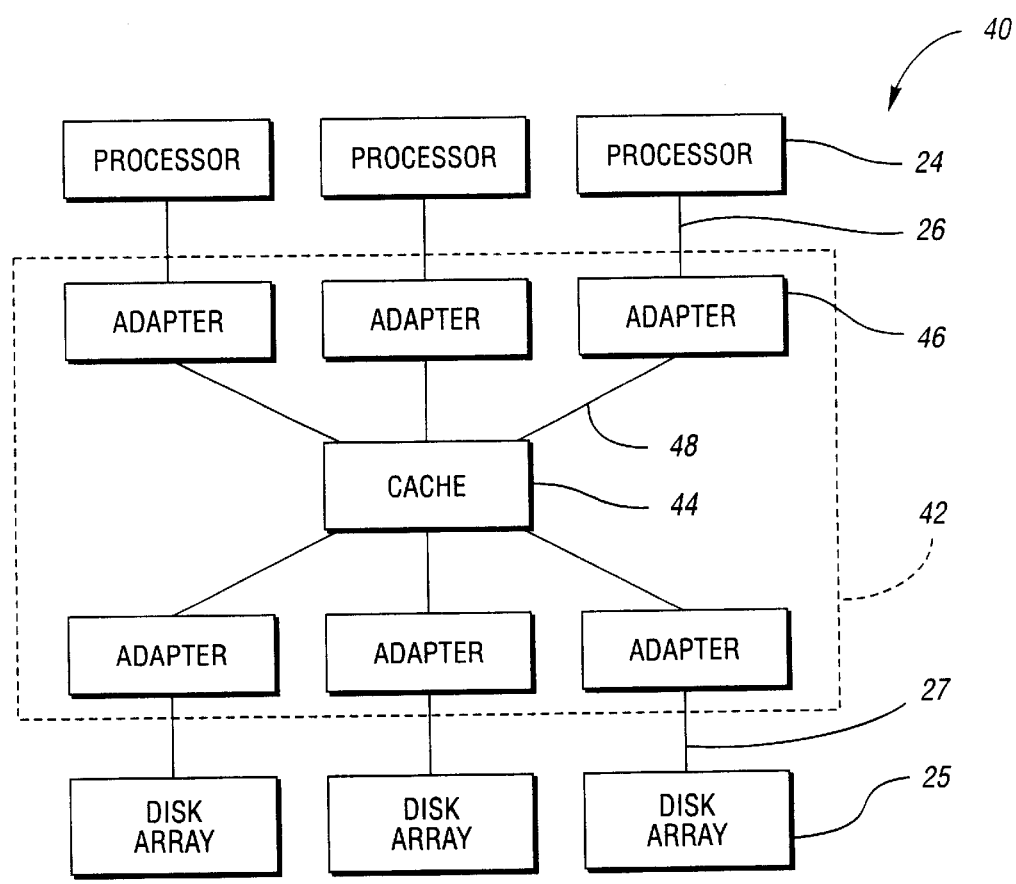
FIG. 2 is a block diagram of a computer system having a DASD controller according to the present invention.

Referring now to FIG. 2, a block diagram of a computer system having a serial link DASD controller cache system is shown. Serial link computer system 40 includes the same processors 24, disk arrays 25, processor buses 26 and disk array buses 27 as in parallel computer system 20. However, serial link DASD controller 42 is substituted for parallel DASD controller 22. Although three processors, three disk arrays, and six adapters are shown, any number of processors and disk arrays together with their associated adapters are possible in computer system 40.

DASD controller 42 contains serial cache 44. Serial adapter 46 provides the interface between processor 24 or disk array 25 and cache 44, connected through processor bus 26 or disk array bus 27 respectively and adapter 46. A performance increase will occur by replacing parallel bus 32 with bidirectional multichannel serial link 48 between each adapter 46 and cache 44.

Figure 3:
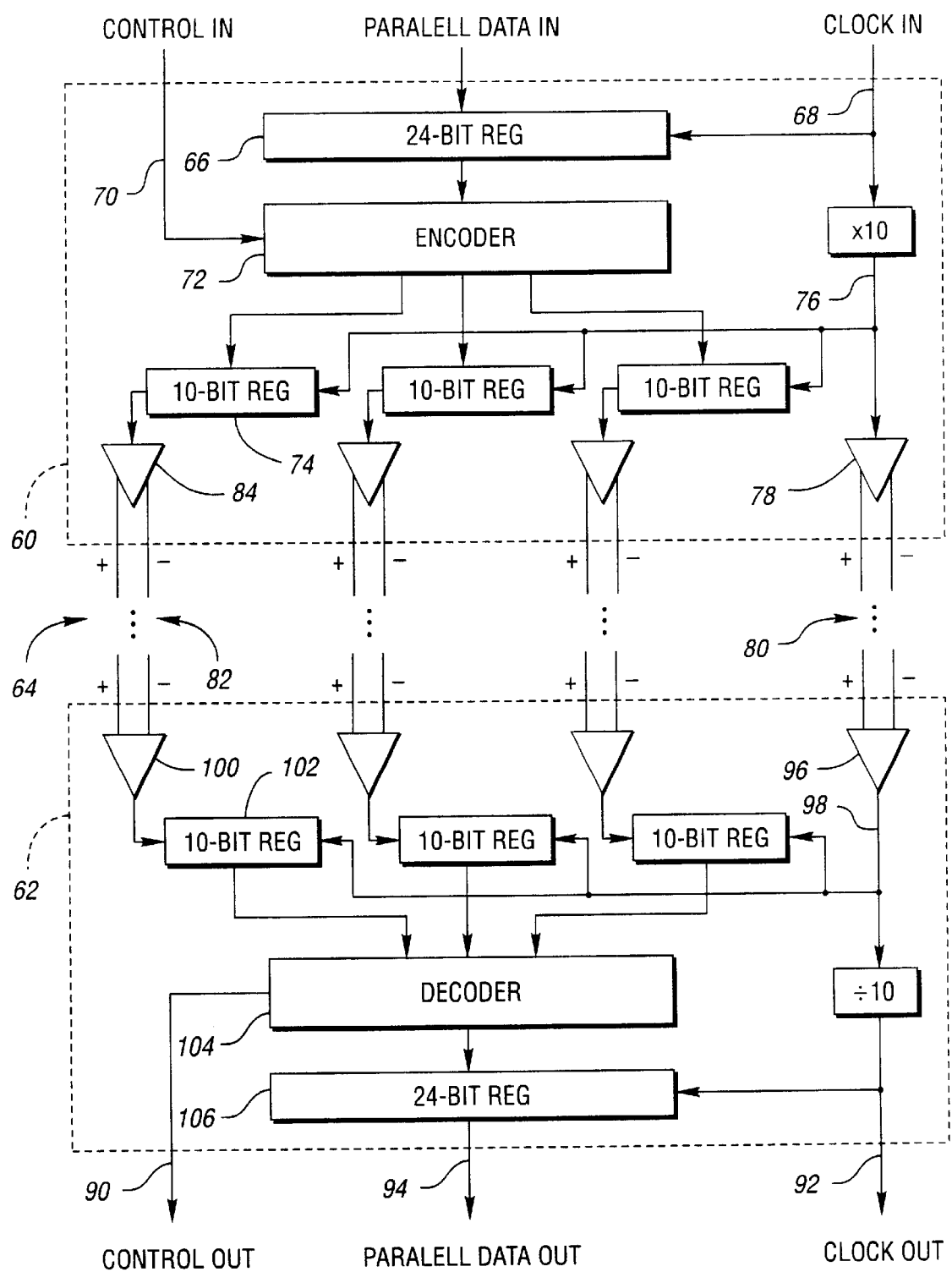
FIG. 3 is a schematic diagram of a set of driver and receiver pairs implementing a multichannel serial link according to the present invention.

Referring now to FIG. 3, a schematic diagram of a set of driver and receiver pairs implementing a multichannel serial link according to the present invention is shown. Each bidirectional multichannel serial link 48 includes two unidirectional multichannel serial links, each unidirectional link providing communication in one direction. Group serial transmitter 60 (TX) sends and group serial receiver 62 (RX) receives serial signals over a set of three or more serial channels, shown generally by 64. Set of serial channels 64 connecting group serial transmitter 60 and group serial receiver 62 defines a point-to-point unidirectional multichannel serial path.

Group serial transmitter 60 accepts parallel data in input register 66 clocked by input parallel clock 68. Group serial transmitter 60 also accepts control input on control in bus 70. Control input may include, but is not limited to, indications for error, read frame, write frame, diagnostic frame, start of frame, and end of frame.

Encoder 72 receives control input from control in bus 70 and data from input register 66. Encoder 72 develops a parallel code corresponding to either the control input on control in bus 70 or the data value in input register 66 depending on the control input on control in bus 70. Parallel-to-serial register 74 accepts a portion of the parallel code from encoder 72 and shifts out a serial sequence bit stream clocked by serial clock 76. Serial clock 76 is produced by multiplying the frequency of input parallel clock 68 by a value equal to the number of bits in parallel-to-serial register 74. Serial clock driver 78 outputs a signal corresponding to serial clock 76 onto serial clock channel 80. Each of the remaining channels in set of serial channels 64 is a serial data channel, one of which is shown as 82, and is driven by a corresponding serial data driver 84. Serial data channel 82 transmits a signal corresponding to the serial sequence bit stream produced by parallel-to-serial register 74.

In a preferred embodiment, serial data drivers 78 and serial clock driver 84 are implemented with a serial flat panel display driver having a differential output such as the SII140 manufactured by Silicon Image, Inc. The non-standard use of serial flat panel display drivers allows construction of a high reliability communication link. This link has an inherently low cost due to the volume leverage of the flat panel display industry. Furthermore, continued developments in flat panel technology will produce increasing serial transfer rates and increasing functionality at decreasing piece prices.

In order to exploit the differential output of serial driver 78,84, encoder 72 is operative to produce a DC balanced signal. In particular, encoder 72 accepts a 24-bit input word and develops a 30-bit code. The 30-bit code is divided into three 10-bit codes, each of which is DC balanced within one bit. The one-bit out-of-balance is compensated for by inserting idle clockings between frames. Each 10-bit code is clocked into a corresponding parallel-to-serial register 74.

Referring again to FIG. 3, group serial receiver 62 accepts serial channels 64 and outputs control on control out bus 90 corresponding to the control signal input on control in bus 70, output parallel clock 92 corresponding to input parallel clock 68, and output parallel data 94 clocked by output parallel clock 92 corresponding to the data received by input register 66.

Serial clock receiver 96 accepts serial clock channel 80 and outputs serial clock 98. Each serial channel 82 carrying a serial sequence bit stream is received by a serial data receiver 100. Serial data receiver 100 outputs a signal to serial-to-parallel register 102 clocked by serial clock 98. Each serial-to-parallel register 102 delivers a parallel word to decoder 104. Decoder 104 produces a control signal on control out bus 90 or a parallel data word depending on the value received by decoder 104. Serial clock 98 is divided by a factor equal to the number of bits in serial-to-parallel register 102 to produce output parallel clock 92. Data output from decoder 104 is clocked into output register 106 by output parallel clock 92. The output of output register 106 is output parallel data 94.

In a preferred embodiment, serial data receivers 100 and serial clock receiver 96 are implemented with a serial flat panel display receiver having a differential input and matching serial data drivers 78 and serial clock driver 84, such as the SII141 manufactured by Silicon Image, Inc. Decoder 104 converts the balance coded input from serial-to-parallel registers 102 into an uncoded value. To match the encoding scheme used in group serial transmitter 60, three 10-bit registers 102 are used for serial-to-parallel conversion and the resulting 30-bit encoded value is decoded by decoder 104.

Figure 4:
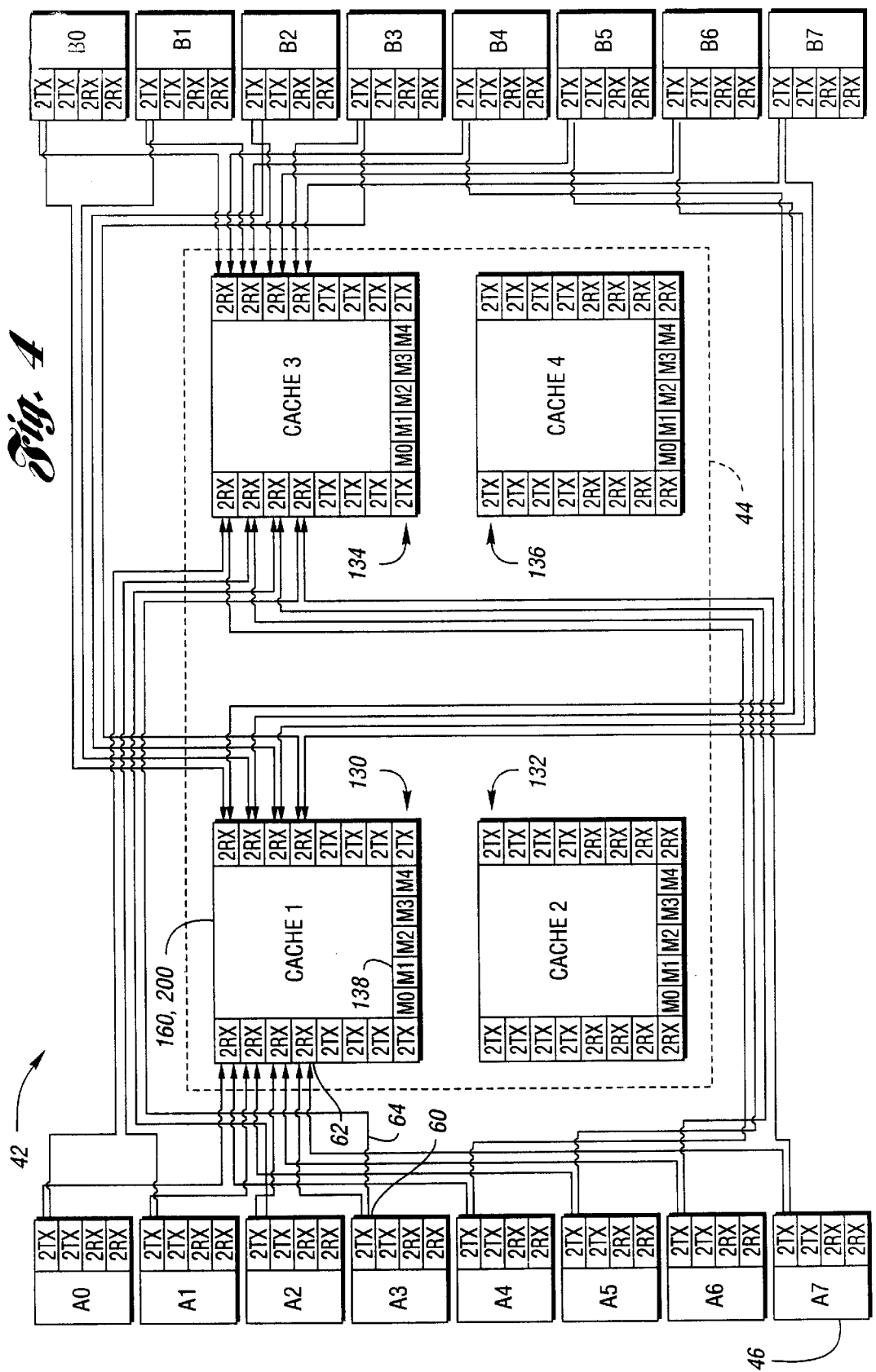
FIG. 4 is a schematic diagram of an illustrative cache architecture showing a portion of the data connections according to the present invention.

Referring now to FIG. 4, a schematic diagram of an illustrative cache architecture according to the present invention is shown. As will be described below, only a portion of the data connections have been included.

In the example architecture, DASD controller 42 includes sixteen adapters, one of which is indicated by 46. Cache 44 is divided into at least one memory card. The example shown has four cards indicated as Cache 1 130, Cache 2 132, Cache 3 134, and Cache 4 136. Each hub 160,200 in each memory card 130,132,134,136 is connected by a data link to each adapter 46. In the example shown in FIG. 4, each memory card 130,132,134, 136 has a single hub 160,200. Only the unidirectional data links 64 from adapters 46 to memory cards 130,134 for the top half are shown in FIG. 4 for clarity. This represents one-quarter of the total number of unidirectional data links 64 between adapters 46 and cache 44. Simplex hub 160 and duplex hub 200 are discussed with regards to FIGS. 4 and 5 below respectively.

The memory on each card is divided into memory banks, one of which is indicated by 138. Each memory bank 138 can service one memory request at a time. In the exemplary embodiment shown, each memory card has five memory banks labeled as M0, M1, M2, M3, and M4.

Interconnection between each memory card, such as 132, and its associated adapter 46 is through bidirectional multichannel serial links 48. Each link 48 is shown as a pair of unidirectional links comprising group serial transmitter 60 connected to group serial receiver 62 through serial channels 64. The operation of a unidirectional link is described with regards to FIG. 3 above.

Figure 5:
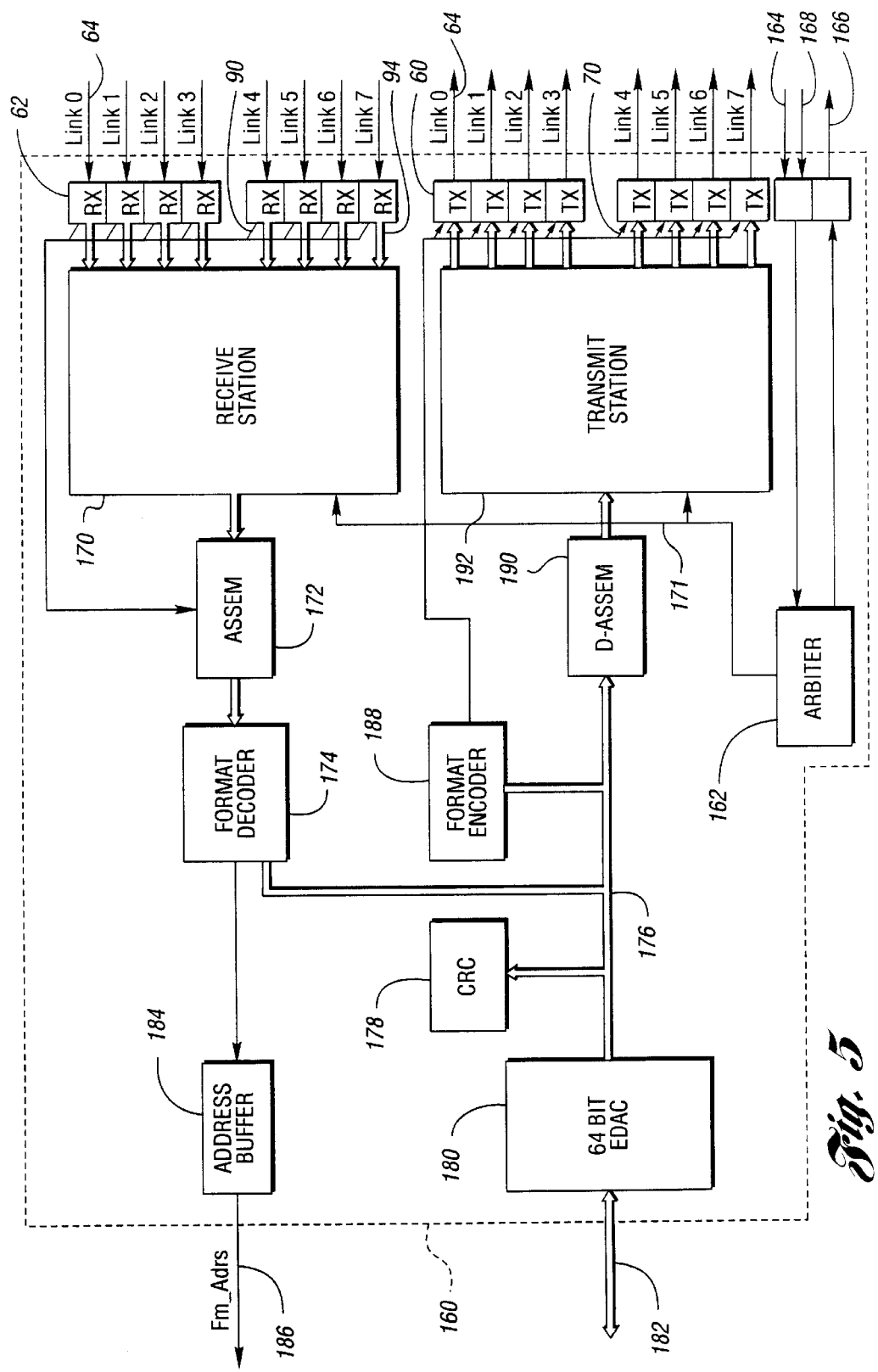
FIG. 5 is a schematic diagram of an exemplary serial hub for simplex operation according to the present invention.

Referring now to FIG. 5, a schematic diagram of an exemplary serial hub for simplex operation according to the present invention is shown. At least one simplex hub 160 is used on each memory card 130,132,134, 136 in embodiments of the present invention that use simplex hub 160. In FIG. 5, eight adapters are connected to hub 160, as indicated by the eight incoming unidirectional links 64 and eight outgoing unidirectional links 64. Each simplex hub 160 can provide access to one memory bank 138, not shown for clarity, during a memory access period.

Arbiter 162 determines which adapter 46 connected to memory card 130,132,134,136 will be selected. Each adapter 46 connected to hub 160 has a request line, the collection of which is indicated by request bus 164. Arbiter 162 indicates which adapter 46 is selected by asserting the corresponding grant line, the collection of which is indicated by grant bus 166.

In an embodiment with more than one hub 160 in each memory card 130,132,134,136, adapter 46 is also connected to bank bus 168. Once granted access, adapter 46 indicates to which bank access is requested by placing the bank number on bank bus 168. Control and arbitration is further discussed with regards to FIGS. 7, 8, and 10 below.

The receive data path begins with a set of incoming unidirectional serial data links 64. Each link is connected to a group serial receiver 62, which outputs short parallel data 94 corresponding to a received sequence of serial bits. The operation of group serial receiver 62 is described with regards to FIG. 3 above. The output of each group serial receiver 62 is input into receive section 170. Receive section 170 operates as a multiplexer, using selected adapter signal 171 from arbiter 162 to select which group serial receiver 62 output to forward to assembler 172. Receive section 170 must switch between different group serial receivers 62, each driven by a clock in corresponding adapter 46, without allowing glitching. A design for glitchless receiving is described in U.S. Pat. No. 5,974,058 titled "System and Method for Multiplexing Serial Links" issued Oct. 26, 1999 to Burns et al.

Assembler 172 accepts three short parallel data words and constructs a wide parallel word. In the exemplary embodiment, short parallel data 94 is 24 bits and the wide parallel words are 72 bits. Format decoder 174 accepts the output of assembler 172 as well as frame commands from the control out bus 90 of each group serial receiver 62. Format decoder 174 decodes memory address and mode information contained in the frame commands. Format decoder 174 also identifies the field type, stores the current mode, and outputs control signals. Format encoder outputs data onto internal data bus 176.

Cyclic redundancy code (CRC) module 178 checks the accuracy of incoming data using bits included in the wide data word. Error detection and correction (EDAC) module 180 introduces bits to detect and correct errors that may occur while data is stored in memory bank 138.

Each memory bank 138 served by hub 160 is connected to hub 160 through data bus 182. The address of the current write location in memory is held in address buffer 184 and sent to memory bank 138 on address bus 186. Address buffer is loaded by format decoder 174.

The transmit data path is substantially the reverse of the receive data path. Address buffer 184 puts out the location to be read on address bus 186. The data is read from memory bank 138 onto bus 182 and into EDAC module 180. EDAC module 180 checks and corrects errors introduced by data storage and outputs the corrected data to internal data bus 176. CRC module 178 adds bits for detecting and correcting errors in transmission. Format encoder 188 generates stage frame commands for delivery to each group serial transmitter 60.

Disassembler 190 breaks wide parallel words into short parallel words. Transmit section 192 serves as a demultiplexer, selecting the appropriate group serial transmitter 60 based on selected adapter signal 171. Data is sent from group serial transmitter 60 on unidirectional multichannel serial link 64.

Figure 6:
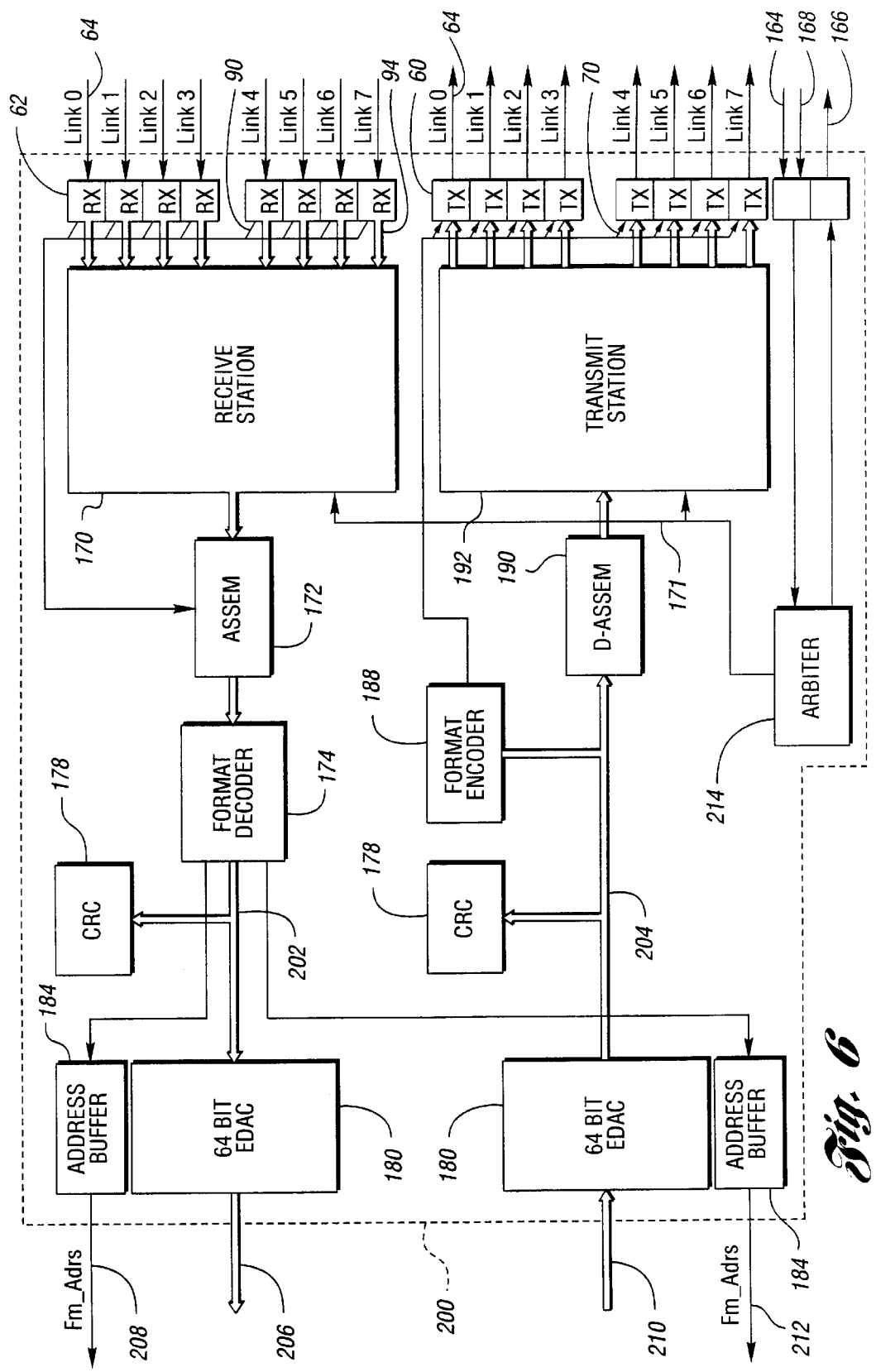
FIG. 6 is a schematic diagram of an exemplary serial hub for duplex operation according to the present invention.

Referring now to FIG. 6, a schematic diagram of an exemplary serial hub for duplex operation according to the present invention is shown. At least one duplex hub 200 is included on each memory card 130,132, 134,136 in embodiments of the present invention using duplex hub 200. The operation of duplex hub 200 is similar to the operation of simplex hub 160 described with regards to FIG. 5 above except that duplex hub 200 is capable of simultaneous memory read and write.

In order to accomplish simultaneous memory read and write, duplex hub 200 must have two copies of all memory access components. In particular, internal data bus 176 becomes internal write bus 202 and internal read bus 204. Two copies of CRC module 178, EDAC 180, and address buffer 184 are needed. Two buses to memory banks 138 are required. Write bus 206 sends data to memory at the location specified by write address 208. Read bus 210 receives data from memory at the location specified by read address 212.

Duplex arbiter 214 must determine if either or both of memory read and write will occur. Control and arbitration is described with regards to FIGS. 7, 9, 10, and 11 below.

Figure 7:
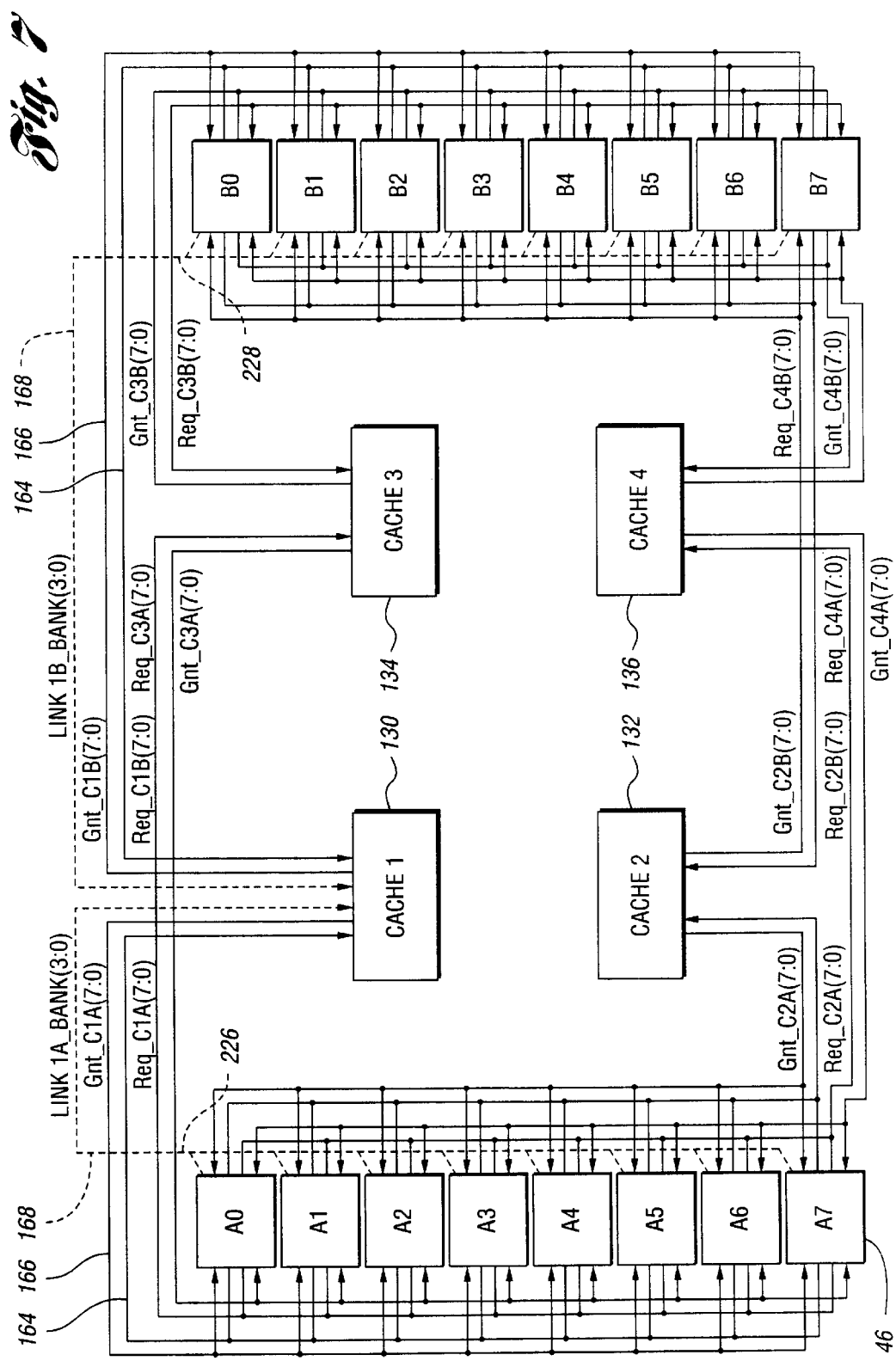
FIG. 7 is a schematic diagram of an illustrative control architecture according to the present invention.

Referring now to FIG. 7, a schematic diagram of an illustrative control architecture according to the present invention is shown. In the exemplary embodiment, sixteen adapters, one of which is indicated by 46, can access four memory cards 130,132,134,136. In a preferred embodiment, adapters are divided into "A side" and "B side". Each arbiter is also assigned a number. One of ordinary skill in the art will recognize that the choice of sides and of numerical designation is arbitrary.

Each adapter 46 requests access to each memory card 130,132,134,136. A request line runs from each adapter 46 to all memory cards. For example, adapter A0 has a request line to Cache 1 130, labeled Req_C1A(0), a request line to Cache 2 132, labeled Req_C2A(0), a request line to Cache 3, 134 labeled Req_C3A(0), and a request line to Cache 4 136, labeled Req_C4A(0) all of which are part of request bus 164. A grant line runs to each adapter 46 from each memory card 130,132,134, 136. For example, adapter A0 has a grant line from Cache 1 130, labeled Gnt_C1A(0), which is part of grant bus 166.

If more than one hub 160,200 is included on each memory card 130,132,134,136, conflicts accessing memory bank 138 within memory card 130,132,134,136 may occur. To arbiter these conflicts, each adapter 46 sends the bank address of desired memory bank 138 to memory card 130,132,143,136 containing memory bank 138. In an embodiment for multiple hubs 160,200, parallel bank bus 168 connects adapter 46 to each memory card 130,132,134,136. In FIG. 7, only the bank bus 168 for Cache 1 130 is shown. For example, all A Side adapters 46 are connected to Cache 1 130 by bank bus 168 labeled link_1A—BANK(4:0), and all B Side adapters 46 are connected by bank bus 168 labeled link_1B—BANK(4:0). All but one of the bank bus lines is used to send the address of the requested bank from adapter 46 to a corresponding memory card 130,132,134,136. The last line in bank bus 168 is used by adapter 46 to signal that the bank address is valid. In the illustrative embodiment shown in FIG. 7, a separate bank bus is shown for each side of adapters 46 for redundancy.

In an alternate embodiment with at least two hubs 160,200 for each memory card 130,132,134,136, bank bus 168 may be split into multiple bank buses, such as A-side bank bus 226 and B-side bank bus 228. Each hub 160,200 may be connected to one bank bus 226,228. Arbiter 162,214 within each hub 160,200 resolves bank conflicts.

Timing diagrams describing the use of request, grant, and bank control lines are described with regards to FIGS. 10 and 11 below.

Figure 8:
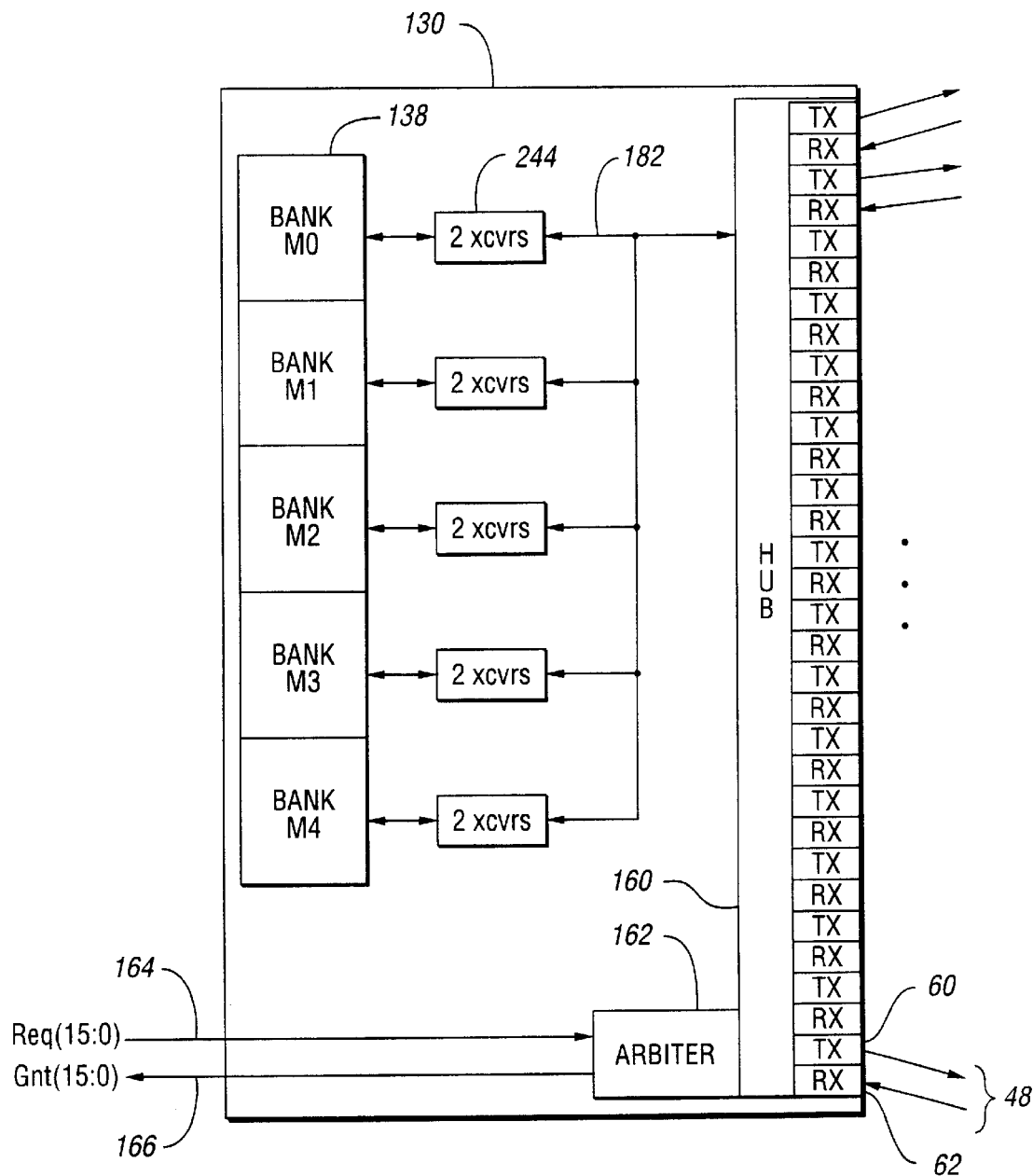
FIG. 8 is a schematic diagram of an exemplary memory card including one simplex hub according to the present invention.

Referring now to FIG. 8, a schematic diagram of a memory card including one simplex hub according to the present invention is shown. Hub 160 is connected to sixteen adapters 46 through bidirectional data links 48, not all of which are shown for clarity. Operation of simplex hub 160 is described with regards to FIG. 5 above. In the exemplary embodiment, memory card 130 has five memory banks 138. Data bus 182 connects hub 160 to each of the five memory banks 138. Transceiver pairs, one pair of which is labeled 244, provide a buffer between path 240 and memory banks 138. In a preferred embodiment, path 240 and memory banks 138 all have the same data width as the wide parallel word developed by assembler 172. In the exemplary embodiment, this data width is 72 bits.

Hub 160 includes arbiter 162 to select a requesting adapter 46. Arbiter 162 is connected to adapters 46 in the appropriate half by request bus 164 and grant bus 166 as described with regards to FIG. 7 above. In FIG. 8, sixteen adapters 46 require sixteen request lines in request bus 164, labeled Req(15:0), and sixteen grant lines in grant bus 166, labeled Gnt(15:0).

Figure 9:
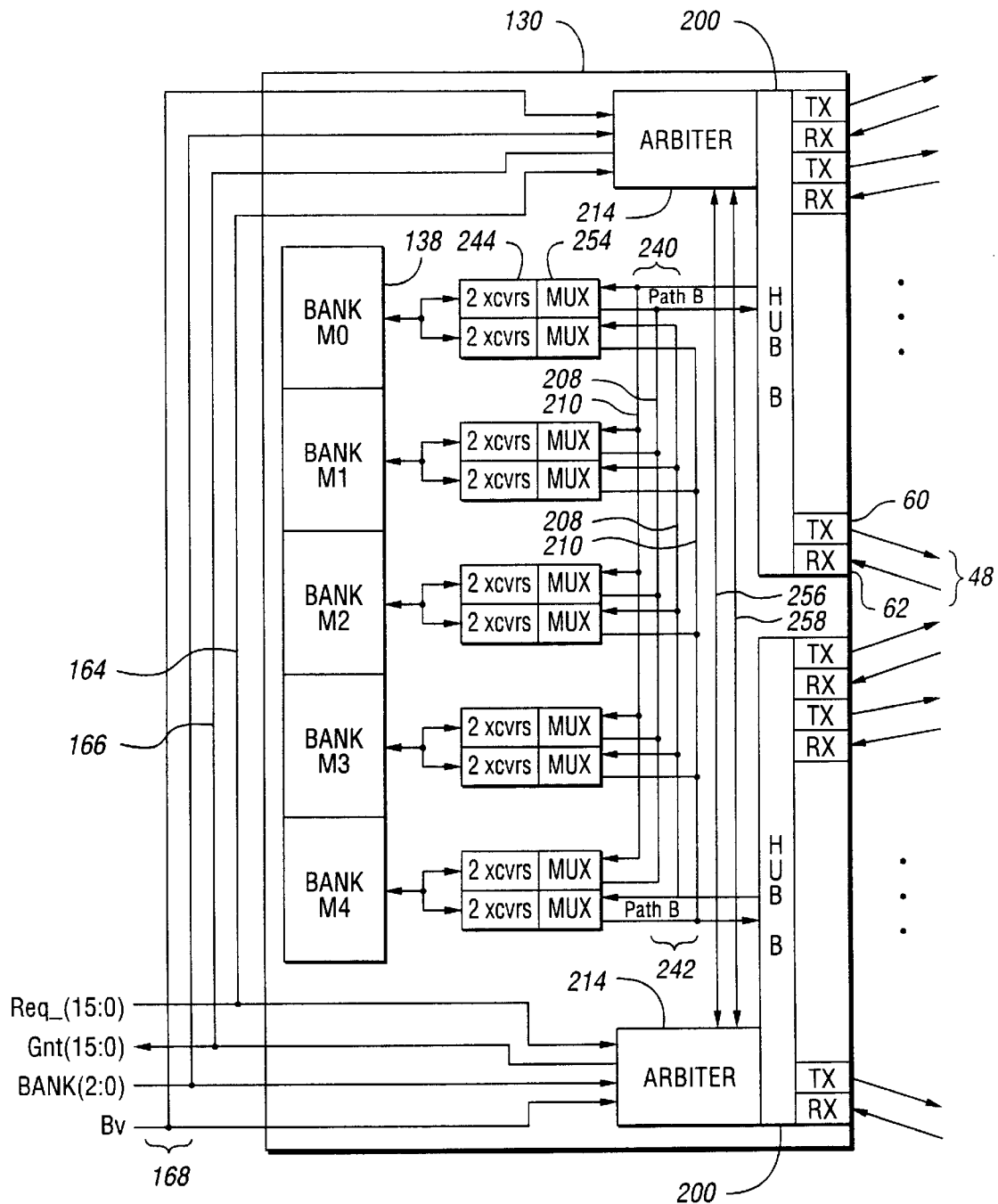
FIG. 9 is a schematic diagram of a memory card including two duplex hubs according to the present invention.

Referring now to FIG. 9, a schematic diagram of a memory card including two duplex hubs according to the present invention is shown. Operation of duplex hub 200 is described with regards to FIG. 6 above. The operation of memory card 130 with duplex hubs 200 is similar to the operation of memory card 130 with simplex hub 160 described with regards to FIG. 8 above except that, since each hub 200 can make two simultaneous memory accesses, a read and a write, and since more than one hub 200 is included in memory card 130, bank conflicts can occur.

As in the simplex case, a path connects each hub 200 in memory card 130 with memory banks 138. In the embodiment shown, Path A 240 connects hub 200 in memory card 130 with five memory banks 138. Path B 242 connects hub 200 in memory card 132 with the same five memory banks 138. In order to support simultaneous write and read, each path 240,242 includes two data buses, write bus 208 and read bus 210. Multiplexer 254 before each transceiver pair 244 selects between write bus 208 and read bus 210.

Since memory card 130 includes more than one hub 160,200, bank arbitration must be carried out by arbiter 214. To accomplish bank arbitration, arbiter 214 is connected to adapters 46 through bank bus 168. In FIG. 8, bank bus 168 shows the bank address lines, BANK(2:0), and bank valid line, Bv, separately. Each selected adapter 46 must send to memory card 130 the address of memory bank 138 to which access is requested in order to prevent bank conflicts. One architecture provides one bank bus 168 for each hub 200, allowing arbiters 46 to transmit bank addresses simultaneously. An alternative architecture provides one bank bus 168 for each card 130, requiring selected arbiters 46 to take turns transmitting bank addresses. In the exemplary embodiment with two hubs 200 and five memory banks 138 per memory card 130, the first architecture requires an eight-bit bank bus 168, two three-bit address buses and two bank valid lines. In a preferred embodiment, one four-bit bank bus 168 is used. Control bus 256 and internal bank bus 258 allow arbiter 214 to exchange information with other arbiters 214 on memory card 130 to permit bank conflict arbitration. Arbitration and control using the bank bus is described with regards to FIG. 11 below.

The embodiments described in FIGS. 8 and 9 represent only two of many possible. Any number of cards 130,132, 134,136 may be used. Any number of hubs 160,200 per each memory card 130 may be used. Hubs may be either simplex hubs 160 or duplex hubs 200. Any number of memory banks 138 may be on each card 130 with the number of memory banks 138 per card 130 generally increasing as the number of hubs 160,200 increases to reduce the potential for bank conflicts. Further, any number of adapters 46 may be supported.

Figure 10:
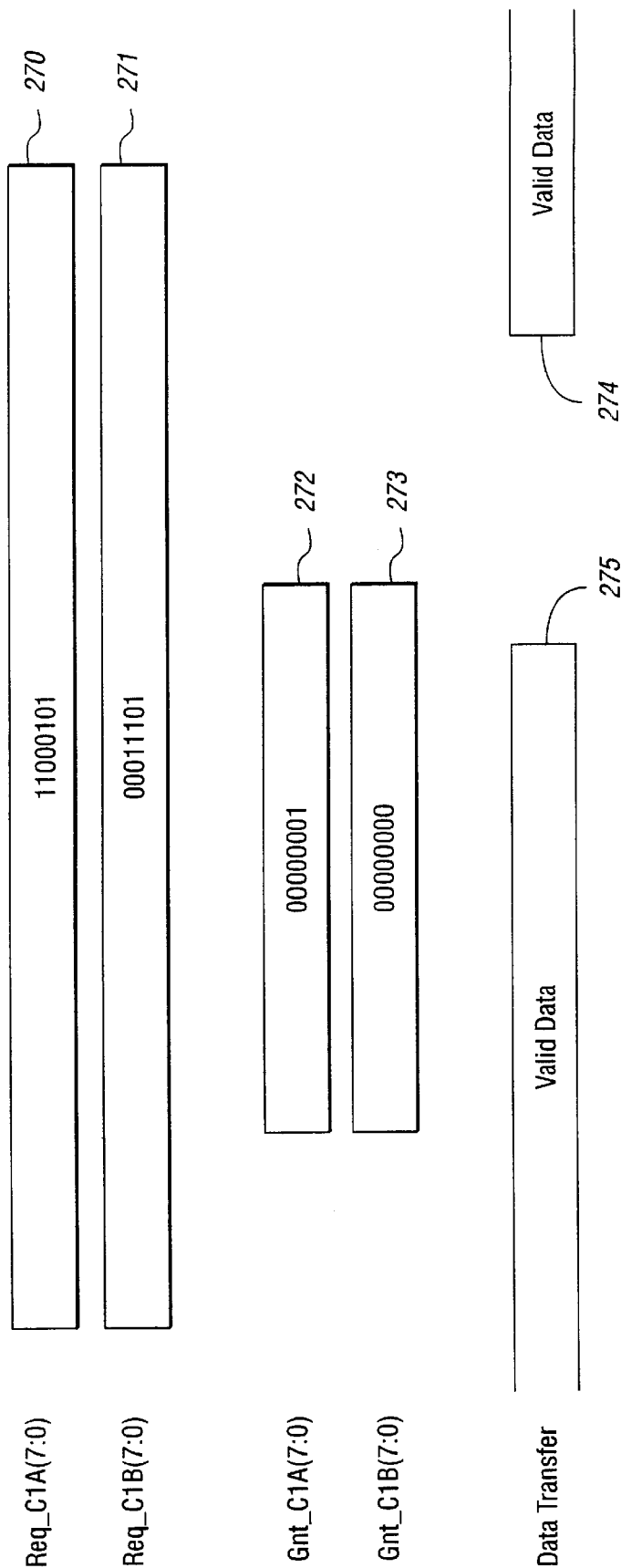
FIG. 10 is a conceptualized timing diagram illustrating a control sequence for a single simplex hub embodiment of the present invention.

Referring now to FIG. 10, a conceptualized timing diagram illustrating a control sequence for a single simplex hub embodiment of the present invention is shown. The timing diagram shows one request sequence for Cache 1 130. The sequence begins with each adapter 46 desiring access to memory bank 138 in memory card 130 asserting its corresponding request line. Request bus Req_C1A(7:0) indicates adapters A0, A2, A6, and A7 desire access to Cache 1 130, as shown by request signals 270. Request bus Req_C1B (7:0) indicates adapters B0, B2, B3 and B4 desire access to Cache 1 130, as shown by request signals 271.

Arbiter 162 selects adapters 46 to which access will be granted. One scheme for adapter selection arbitration is a round robin scheme that toggles priority between sides for each request sequence and takes adapters on each side in numerical order. For example, if all adapters desired access, the sequence of grants might be A0, B0, A1, B1, A2, . . . Other arbitration algorithms are possible, including granting priority to least recently used, least frequently used, most recently used, and random selection. Most recently used is attractive in that, if memory banks 138 are comprised of dynamic RAM (DRAM) arranged in rows, significant speedup can be achieved by accessing a row left open from the previous access. In this case, bank bus 220 may transmit row addresses as well as bank addresses. In a preferred embodiment, round robin is used to ensure fairness.

Once adapter arbitration is decided, arbiter 162 asserts the appropriate grant line. For the illustrative timing diagram, adapter A0 has been selected as indicated by grant bus signals Gnt_C1A(7:0) 272 and Gnt_C1B(7:0) 273. Data transfer with adapter A0 may then begin, as indicated by new valid data signal 274. In a preferred embodiment, data transfer and arbitration are overlapped, as indicated by previous valid data signal 275.

Figure 11:
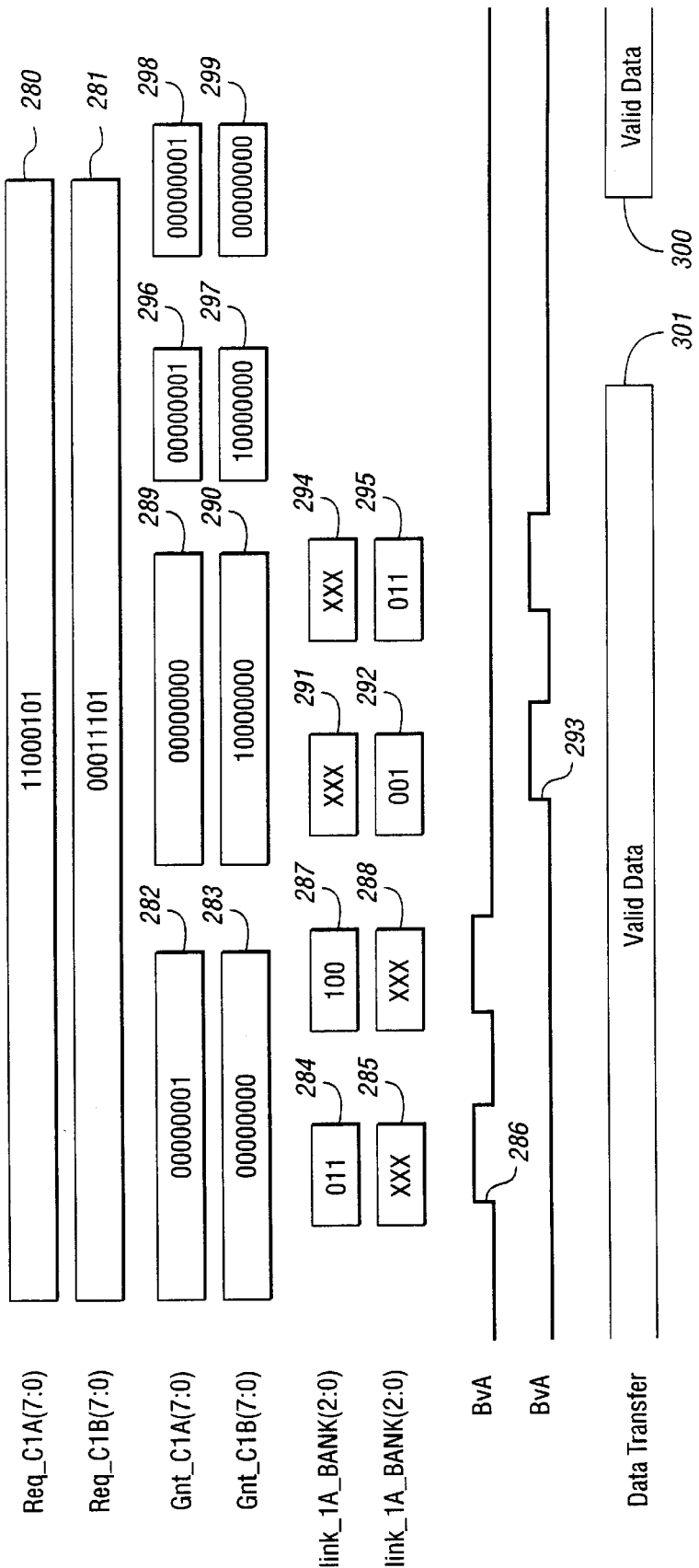
FIG. 11 is a conceptualized timing diagram illustrating a control sequence for a dual duplex embodiment of the present invention.

Referring now to FIG. 11, a conceptualized timing diagram illustrating a control sequence for a dual duplex embodiment of the present invention is shown. In this embodiment, bank bus 168 has sufficient width to transmit one bank address at a time. The timing diagram shows one request sequence for Cache 1 130.

The sequence begins with each adapter 46 desiring access to memory bank 138 in memory card 130 asserting its corresponding request line in request bus 164. Request bus Req_C1A(7:0) indicates adapters A0, A2, A6, and A7 desire access to Cache 1 130, as shown by request signals 280. Request bus Req_C1B(7:0) indicates adapters B0, B2, B3 and B4 desire access to Cache 1 130, as shown by request signals 281.

As described with regards to FIG. 10 above, arbiter 214 determines which adapters 46 are selected. Arbiter 214 then grants access to a first selected adapter 46 by asserting the appropriate line in grant bus 166. Gnt_C1A(7:0) signal 282 and Gnt_C1B(7:0) signal 283 indicate that adapter A0 has been selected. Selected adapter 46 responds by first placing the bank address for memory read, link_1A—BANK(2:0) signal 284, onto bank bus 168 and asserting bank valid signal BvA 286, then by placing the bank address for memory write, link 1A_BANK(2:O) signal 287, onto bank bus 168 and asserting bank valid signal BvA 286. In the example, memory banks 138 M3 for read and M4 for write are requested. Since only one bank address may be placed on bank bus 168 at any time, the values on link_1A—BANK (2:0) represented by signals 285 and 288 are irrelevant. If selected adapter 46 does not wish to either write to or read from memory, an unused address, such as all ones, may be sent on bank bus 168.

Once the first selected adapter 46 has sent its requested memory bank addresses, arbiter 214 asserts the appropriate line in grant bus 166 for the next adapter 46. As shown in Gnt_C1A(7:0) signal 289 and Gnt_C1B(7:0) signal 290, adapter B7 is selected. The next selected adapter 46 repeats the process of placing requested memory read and write bank addresses on bank bus 168. As indicated by signals 291,292,293,294, and 295, read from memory bank M1 and write to memory bank M3 are requested.

Arbiter 214 now performs memory bank arbitration. If no conflicts exist, all requests to memory banks 138 are granted. Conflicts can be resolved by a variety of algorithms, including random, round robin, always grant read before write, always grant write before read, least recently granted, most recently granted, and combinations of the above. For the example shown, adapter A0 wishes to read from M3 and adapter B7 wishes to write to M3. Arbiter 214 decides to grant read access to adapter A0.

Once arbitration is completed, arbiter 214 uses grant bus 242 to indicate access. Gnt_C1A(7:0) and Gnt_C1B(7:0) are first used to indicate granted read access. Signals 296 and 297 indicate that adapters A0 and B7 may both proceed with memory read operations. Gnt_C1A(7:0) and Gnt_C1B (7:0) are nest used to indicate granted write access. Signals 298 and 299 indicate that adapter A0 only may proceed with memory write operations.

Once access is granted, data transfer may begin as shown by new valid data signal 300. In a preferred embodiment, the arbitration cycle is overlapped with the previous data transfer period, as shown by previous valid data signal 302.

In an embodiment of the present invention, bank bus 168 is split into A-side bank bus 226 and B-side bank bus 228. Each bank bus 226,228 has adequate width to transmit both read and write bank addresses simultaneously. For the example above, grant signals 282 and 290 indicate that adapters A0 and B7 may transmit bank addresses to which access is requested. Then, bank address signals 284, 287, 292, and 295 are transmitted simultaneously, followed by assertions of Bva signal 286 and BvB signal 293. This embodiment requires less hardware in arbiter 214.

In another embodiment of the present invention, arbiter 214 can store ungranted bank access requests. These requests are used by arbiter 214 in subsequent arbitration to maximize bank utilization.

The timing diagrams of FIGS. 10 and 11 are conceptualized. The signals are not drawn to indicate actual lengths of time or time overlaps. Further, adapters 46 are not synchronized to each other and, therefore, signals from adapters 46 may not change simultaneously as shown.

Referring now to FIG. 12, a block diagram of tasks in adapter 46 control logic according to the present invention is shown. Simultaneous stage and destage in adapter 46 is facilitated through the use of concurrent tasks. Control task 320 accepts master orders and decomposes the master orders into read and write tasks, which are placed in read queue 322 and write queue 324 respectively. Read task 326 and write task 328 each take jobs from their respective queues, control data transfer, and report status.

Master orders 330 are received by master order task 332 in control task 320. Master order task 332 is responsible for decomposing master order 330 into read orders and write orders, determining which orders may be run in parallel, and controlling the functioning of other tasks. Master order 330 is divided into sections, each of which contains read and write operations that may be carried out in parallel. Once each section is completed, the operations in the next section may be carried out in parallel.

Master order task 332 places read and write orders into first-in first-out order queue 324. Orders are read from order queue 334 by manager task 336, which manages first-in first-out read queue 322 and first-in first-out write queue 324.

Read task 326 is initiated to handle a read order. Write task 328 is initiated to handle a write order. Both tasks transition through a sequence of phases including Setup, Initiate, Wait, Complete, and, if necessary, Error Recovery. Setup and Initiate take care of internal and external initialization, including partitioning the read or write order into blocks of a size handled by adapter 46 and cache 48 hardware. These blocks are then received as read data 338 or write data 340. Wait is entered while each block is received or transmitted. If all blocks are handled successfully, a Complete state is entered. If an error occurred, Error Recovery state is entered.

Read task 326 provides read status 342 to master order task 332. Write task 328 provides write status 344 to master order task 332. The status 342,344 indicates the success or failure of read and write orders. Master order task 332 must be capable of receiving status 342,344 in any order, since read and write orders may be processed asynchronously and non-sequentially. Master order task 332 reports master order status 346.

In a preferred embodiment, multiple read tasks 326 and write tasks 328 may exist concurrently, allowing adapter 46 to proceed with simultaneous staging and destaging if access to a desired memory bank 138 is blocked.

In a preferred embodiment, write task 328 is capable of transmitting the same information to multiple locations to facilitate data mirroring for use in, for example, RAID implementations.

While the best modes for carrying out the invention has been described in detail, those familiar with the art to which this invention relates will recognize various alternative designs and embodiments for practicing the invention as defined by the following claims.

What is claimed is:

1. A cache system serving a plurality of computer elements comprising:
    a plurality of adapters, each adapter in communication with at least one of the computer elements;
    a cache divided into a plurality of memory cards; and
    a plurality of bidirectional multichannel serial links connecting each adapter with each memory card, each link connecting one of the plurality of adapters with one of the plurality of memory cards.

2. The cache system as in claim 1 wherein each memory card comprises:
    at least one memory bank; and
    at least one hub in communication with each memory bank, each hub operable to transmit and receive data over at least one of the plurality of bidirectional multichannel serial links.

3. The cache system as in claim 2 wherein the at least one hub is one hub and the at least one memory bank is five memory banks.

4. The cache system as in claim 2 wherein the at least one hub is a simplex hub, permitting either memory read or memory write during a memory access period.

5. The cache system as in claim 2 wherein the at least one hub is a duplex hub, permitting simultaneous memory read and memory write during a memory access period.

6. The cache system as in claim 1 wherein each bidirectional multichannel serial link comprises:
    a plurality of serial data drivers in the adapter and a plurality of serial data receivers in the memory card, each serial data receiver in the memory card corresponding to one of the plurality of serial data drivers in the adapter;
    a first plurality of unidirectional pairs, each pair carrying serial data from one of the plurality of serial data drivers in the adapter to the corresponding serial data receiver in the memory card;
    a plurality of serial data drivers in the memory card and a plurality of serial data receivers in the adapter, each serial data receiver in the adapter corresponding to one of the plurality of serial data drivers in the memory card; and
    a second plurality of unidirectional pairs, each pair carrying serial data from one of the serial data drivers in the memory card to the corresponding serial data receiver in the adapter.

7. The cache system as in claim 1 wherein each direction of the bidirectional multichannel serial link comprises:

a plurality of serial data drivers;

a serial data receiver corresponding to each of the plurality of serial data drivers, the serial data receiver in communication with the corresponding serial data driver;

a serial clock driver; and a serial clock receiver in communication with the serial clock driver.

8. The cache system as in claim 7 wherein at least one serial data driver comprises a flat panel display driver.

9. The cache system as in claim 7 wherein at least one serial data receiver comprises a flat panel display receiver.

10. The cache system as in claim 7 wherein the serial clock driver comprises a flat panel display driver.

11. The cache system as in claim 7 wherein the serial clock receiver comprises a flat panel display receiver.

12. The cache system as in claim 7 wherein each direction of the bidirectional multichannel serial link further comprises a group serial transmitter, the group serial transmitter operative to (a) input a parallel data value at a slow clock rate;

(b) convert the parallel data value into a plurality of serial sequences;

(c) generate a fast clock rate from the slow clock rate;

(d) transmit each serial sequence using one of the plurality of serial data drivers at a rate determined by the fast clock rate; and (e) transmit a signal corresponding to the fast clock rate using the serial clock driver.

13. The cache system as in claim 12 wherein each direction of the bidirectional multichannel serial link further comprises a group serial receiver, the group serial receiver operative to:

(a) accept the signal corresponding to the fast clock rate from the serial clock driver;

(b) accept the plurality of serial sequences from the plurality of serial data drivers;

(c) generate a slow clock rate from the fast clock rate;

(d) convert the plurality of serial sequences to a parallel representation of the data value;

(e) output the parallel representation of the data value at the slow clock rate; and (f) output a signal corresponding to the slow clock rate.

14. The cache system as in claim 1 wherein each adapter comprises a control logic, the control logic comprising:

a control task operative to receive a master order, to decompose the master order into read orders and write orders, and to receive status information;

a read queue in communication with the control task, the read queue operative to hold read orders;

at least one read task in communication with the read queue, the read task operative to input at least one cache read order, decompose the at least one read order into a sequence of cache reads, control the sequence of cache reads, and transmit status information to the control task;

a write queue in communication with the control task, the write queue operative to hold write orders; and at least one write task in communication with the write queue, the write task operative to input at least one cache write order, decompose the at least one write order into a sequence of cache writes, control the sequence of cache writes, and transmit status information to the control task.

15. The cache system as in claim 14, the write task further operative to send the same sequence of cache writes to a plurality of memory banks thereby implementing data mirroring.

16. A cache memory system serving a plurality of computer elements comprising:

a plurality of adapters, each adapter in communication with at least one of the plurality of computer elements;

a plurality of memory cards, each memory card comprising at least one addressable memory bank and at least one hub, each hub comprising an arbiter, wherein each hub is in communication with each of the at least one memory bank and wherein the arbiter is in communication with each adapter and is operable to select at least one adapter for accessing a memory bank; and a plurality of bidirectional multichannel serial data links wherein each adapter is connected to each hub in each of the plurality of memory cards by one of the plurality of bidirectional multichannel serial data links.

17. A cache system as in claim 16 further comprising:

a request line from each adapter to each arbiter, each adapter operable to assert the request line when access to the memory card containing the corresponding arbiter is requested; and a grant line from each arbiter to each adapter;

wherein each arbiter is further operable to determine a selected adapter to which access will be granted and to assert the grant line to the selected adapter.

18. The cache system as in claim 17 further comprising at least one bank bus, each bank bus connecting the arbiter in one of the plurality of memory cards to at least one adapter.

19. The cache system as in claim 18 wherein each selected adapter is further operable to place the address of a memory bank to which access is desired on the bank bus connected to the memory card containing the memory bank to which access is desired and wherein each arbiter is further operable to receive at least one bank address from each selected adapter and to grant access to memory banks based on the received bank addresses.

* * * * *